(12) United States Patent  
Ledbetter et al.

(10) Patent No.: US 8,164,875 B1
(45) Date of Patent: Apr. 24, 2012

(54) PORTABLE MOTORIZED FRAME REMOTE RACKING TOOL

(76) Inventors: Finley Lee Ledbetter, Argyle, TX (US); Ashley Sue Ledbetter, Argyle, TX (US)

( * ) Notice: Subject to any disclaimer, the term of this patent is extended or adjusted under 35 U.S.C. 154(b) by 210 days.

(21) Appl. No.: 12/784,673

(22) Filed: May 21, 2010

Related U.S. Application Data

(63) Continuation-in-part of application No. 12/361,223, filed on Jan. 28, 2009, now Pat. No. 7,804,201, and a continuation-in-part of application No. 12/500,523, filed on Jul. 9, 2009.

(60) Provisional application No. 61/084,897, filed on Jul. 30, 2008.

(51) Int. Cl.
*H02H 3/18* (2006.01)
(52) U.S. Cl. .......................... 361/115; 361/79
(58) Field of Classification Search .............. 361/79, 361/93.1, 115; 307/31, 64
See application file for complete search history.

(56) References Cited

U.S. PATENT DOCUMENTS

| | | | |
|---|---|---|---|
| 5,477,017 A | 12/1995 | Swindler et al. | |
| 6,777,627 B1 | 8/2004 | Stevenson | |
| 6,897,388 B2 | 5/2005 | Greer | |
| 6,951,990 B1 | 10/2005 | Miller | |
| 7,019,230 B1 | 3/2006 | Vaill et al. | |
| 2003/0200648 A1* | 10/2003 | Greer | 29/622 |

* cited by examiner

*Primary Examiner* — Danny Nguyen
(74) *Attorney, Agent, or Firm* — Buskop Law Group, PC; Wendy Buskop (57) ABSTRACT

A portable motorized racking tool and a method for installing, removing and testing electrical equipment is described herein. A circuit breaker having a frame can be attached to a metal surface around the electrical equipment with magnets. The frame can support a solenoid with a plunger, a motor control for operating a motor with a gear assembly that rotates a tool first in one direction, then in a second direction, while the operator controls the framed tool by using a remote switch operator. The remote switch operator can supply power and signals to the framed tool, while the operator can maintain a position outside an arc flash hazard zone.

19 Claims, 10 Drawing Sheets

PORTABLE MOTORIZED FRAME REMOTE RACKING TOOL

CROSS REFERENCE TO RELATED APPLICATIONS

The present application is a continuation-in-part co-pending U.S. patent application Ser. No. 12/361,223 filed Jan. 28, 2009, entitled "PORTABLE REMOTE SWITCH OPERATOR SYSTEM" and is a continuation-in-part of co-pending U.S. patent application Ser. No. 12/500,523 filed Jul. 9, 2009, entitled "PORTABLE ELECTRICAL EQUIPMENT RACKING TOOL", which claims priority and the benefit of U.S. Provisional Patent Application Ser. No. 61/084,897 filed on Jul. 30, 2008, entitled "CIRCUIT BREAKER REPLACEMENT TOOL". These references are incorporated herein in their entirety.

FIELD

The present embodiments generally relate to a framed portable motorized racking tool for removing or installing electrical equipment surrounded by a metal surface, which can be operated by a user outside an arc flash hazard boundary.

BACKGROUND

A need exists for a remotely operable battery powered portable motorized racking tool that can magnetically secure to metal around an insulated case circuit breaker.

A further need exists for a racking tool that is particularly usable with switch gear housings for circuit breakers, wherein the remotely operable racking tool does not need to attach to a wall outlet.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a framed robot or tool for installing or removing electrical equipment within a hazardous arc flash zone.

The present robotic racking tool can be used on all frame sizes of PZ 4/NW MasterPact™ switch gear housings for circuit breakers made by Schneider Electric of Palatine, Ill.

The robotic tool can be particularly versatile because it can be interchangeable. Each interchangeable clutch of the tool can be preset and sized at a manufacturing size, so that no training or specialized knowledge is needed by an operator to change the clutches. In embodiments, the operator need only determine whether a large clutch or a small clutch is needed, and the operator can perfectly operate the tool to install or remove electrical equipment.

Using the robotic tool, operators in chemical plants, hospitals, hotel electrical rooms, and other electrical areas with switch gear and circuit breakers, can tend to a circuit breaker. The operator can track the quantity of amps per circuit breaker or switch gear. In doing so, the operator can predict the amperage needed to install or remove a particular circuit breaker. This predictive ability enables an operator to target circuit breakers that are higher in amps than other switch gears and to take additional protective steps while operating on those circuit breakers.

The operator can operate the robotic tool outside of the arc flash zone, which keeps the operator out of immediate danger.

Operators can typically be from about ten feet to about twenty five feet away from the circuit breaker or the electrical equipment being installed, removed, or tested.

The robotic tool can reduce a facility's need to buy as much protective equipment, such as heavy arc flash suits, which are hot, heavy, and known to cause heart attacks in wearers.

The use of the robotic tool can reduce liability of a facility because of the reduced exposure time to a wearer of the arc flash suit.

A further benefit of the robotic tool is that by using it, an operator can stand behind a shield or other device and be protected from both fire and explosion of an arc flash. The operator can run the tool from a distance away from the install because the remote switch operator can provide both control signals and power, while being operated by a remote controller in the hand of the operator.

One or more embodiments further relate to remotely controllable and powerable portable motorized racking tool for removing or installing electrical equipment surrounded by a metal surface as controlled by an operator outside an arc flash hazard boundary.

The robotic tool can have a frame, which can be made from a first side support with a viewing hole. The frame can be almost as wide as the first side support. The viewing hole can be square, round, elliptical, or another shape that allows clear viewing of the area being rotated by the robotic tool. The viewing hole can be about 2 inches wide by about 2 inches long.

In addition to the viewing hole, the first side support can have a tool hole that can be smaller in size than the viewing hole. In an embodiment, the tool hole can be elliptical, round, or rectangular and can be located on the first side support in line with a rotating tool.

The first side support can have a third hole, which can be a solenoid hole that can be the same size as the tool hole or smaller. In an embodiment, the viewing hole can be square, the tool hole can be elliptical, and the solenoid hole can be rectangular.

All three holes can be formed adjacent each other and located centrally in the first side support of the frame.

The first side support and the second side support of the frame can be a smooth plate, such as a rigid aluminum plate or a stainless steel plate, and can be thin, such as $\frac{1}{16}$ inch thick.

The frame can have a second side support opposite the first side support, which can be the same length.

Both side supports can be made from an L-shaped plate, such as a stainless steel plate, that can be from about 1/32 inches to about 1/2 inches in thickness. The side supports can be thicker in embodiments.

The side supports can be strong and can resist deforming when supporting components of the tool, including the motor installed on the frame.

The side supports can be strong enough to resist deforming when the frame is dropped from a height of about six feet onto concrete.

The frame can have two additional components connecting the side supports. A first beam can be disposed between the first and second side supports, and a second beam can be disposed opposite the first beam between the first and second side supports, to form a square or a rectangle. The frame can be angular, square, or circular.

The beams can each have channels disposed in them, such as one channel per side, to facilitate fastening components to the beams. These components can be or include a handle, a bracket, or a reinforcing gusset.

A power plate can be mounted to the first side support. The power plate can be a 1/4 inch piece of stainless steel plate, which can have a drilled hole or other formed hole that can be circular or another shape. In the hole, the power plate can support an interface plug for engaging a power and signal supply. The power and signal supply can be a remote switch operator.

The interface plug can allow a solenoid signal and power cord to connect from the interface plug to a solenoid for transmitting power and signals to the solenoid.

The interface plug can allow a signal power cord to connect from the interface plug to a motor control housing. The motor control housing can control a motor with a gear box and an associated gear assembly.

A plurality of magnetically shielded magnet housings can be secured to the frame and positioned in each corner of the frame or equidistantly around the frame.

The magnetically shielded magnet housings can be removable and reattachable to the frame. Each magnetic housing can specifically provide a magnetic shielding on five sides, such as on four connected sides of the housing, forming a box, and on the top side through which is passed a shaft connected to a magnet handle.

A magnet can be placed in each magnetically shielded magnet housing and can be operable by the magnet handle. The magnet handle can turn the magnets and unscrew them from the housing for connecting the frame to the metal surrounding the switch gear. The magnet handle can engage a spring that can push the magnet at least a portion of the way out of the magnetically shielded housing, thereby enabling the frame to attach to the metal surface around the switch gear or circuit breaker being installed, removed, tested or otherwise serviced.

The magnet handle can be adapted to both extend and retract the magnets. The magnets can be extendable and retractable without use of the magnet handle. One or more embodiments of the robotic tool can include a handleless version of the magnetic housing and magnets.

In embodiments, the magnet can be secured through the top of the housing. A rotatable magnet handle on one side opposite a magnet face can secure to the metal surface. The magnet handle can be used to rotate and extend the face of the magnet to the metal surface for securing the frame to the metal surface.

A bar can be installed within the perimeter of the frame for providing rigidity to the frame during use and for supporting additional components within the perimeter of the frame.

In embodiments, the bar can be secured parallel to the first side support and adjustably and removably connected to the first beam and the second beam.

In embodiments, the bar can be an aluminum channel with smooth sides on all four surfaces.

In embodiments, the bar can be formed of a lightweight strong material with at least one channel in each of the four sides of the bar. The channels can be used to removably fasten components to the bar, enabling for fast maintenance or reconfiguration of the frame when different parts are needed.

A motor mount plate can be adjustably and removably attached to the bar.

A motor can be removably secured to the motor mount plate. The motor can be powered using power and signals that can be communicated to the motor control housing from the interface plug. The motor can receive its power and signals from a communication cord running from the motor control housing to the motor.

The motor control housing can be adjustably and removably fastened to the bar as well.

The motor can have a gear box associated with it. The motor and gear box can be contained within a single housing.

The gear box portion of the motor and gear box assembly can have a keyway for engaging a key housed in a rotatable shaft of the gear assembly. The key and keyway mechanism and components of the motor can enable an operator to replace rotatable shafts easily and quickly when needed.

The gear assembly of the gear box that can be rotated by the motor, which can have rotatable shaft that can pass through the gear box.

A shaft key way can be formed in the rotatable shaft for engaging the keyway in the gear box. A key, which can be removable from the rotatable shaft, can engage the shaft key way allowing the rotatable shaft to engage the keyway of the gear box, thereby forming an easily detachable but secure locking mechanism.

The rotatable shaft can attach on one end to an extension as part of the gear assembly.

The gear assembly can include a stop. The stop can be positioned between the extension and the rotatable shaft. The stop can be generally round like the shaft. The stop can have a diameter larger than the extension and the rotatable shaft.

A latch can be disposed in an opposite end of the extension. The latch can have a latch mechanism that can engage a coupling. The coupling can connect to a piece of equipment that can secure over the circuit breaker or switch gear to be removed.

An alignment tool can attach to the rotatable shaft and can turn a coupling to align the coupling with any piece of electrical equipment that needs to be serviced. The robotic tool can turn the coupling in a first direction to install a piece of equipment, or turn the coupling in a second direction to remotely remove a piece of equipment using a remote power supply with remote controls that connect to the interface plug.

The robotic tool can have a handle on the frame to position the tool for magnetically gripping the metal surround around the circuit breaker.

In embodiments, the robotic tool can have both a first handle and a second handle. The first handle can be fastened into a channel of the first beam, and the second handle can be fastened into a channel of the second beam to provide easy moving or adjusting if needed by an operator.

The robotic tool can have a solenoid that can move a solenoid plunger attached to the solenoid. The solenoid plunger can extend through the solenoid hole to engage an interlock button on the electrical equipment.

To install electrical equipment, the solenoid can operate the solenoid plunger, moving a portion of the plunger through the solenoid hole to depress the interlock button a first time. Once the interlock button is depressed, the motor can turn the rotatable shaft with the clutch and coupling to allow the electrical equipment to travel to a test position.

One or more embodiments relate to a robotic tool wherein the rotatable shaft is not removably disengageable from the clutch.

The solenoid can operate the solenoid plunger a second time to depress the interlock button, and the motor can continue rotating the shaft in the same direction as it did to the test position, thereby completing the install of the electrical component.

To test only, the solenoid can operate the solenoid plunger through the solenoid hole to depress the interlock button just once to allow the electrical equipment to travel to a test position, and then the motor can operate the gear assembly in a reverse direction to remove the tested equipment.

To remove installed equipment, the solenoid can depress the interlock button once using the solenoid plunger to allow the electrical equipment to travel to a test position from the installed position. Then, the solenoid can operate the interlock button a second time to permit continued rotation of the motor in the same direction of the component and the rotating shaft to fully remove the installed electrical equipment.

To test installed equipment, the solenoid can depress the interlock button a first time using the solenoid plunger to allow the electrical equipment to travel to a test position, and then the motor can operate the gear assembly in the opposite direction to reconnect the electrical equipment once it has been tested.

After using the interlock button and while operating the motor, the rotatable shaft, and the coupling, the operator can view the electrical equipment through the viewing hole from at least about six feet to about twenty feet away from the robotic tool.

In embodiments, a camera, such as a battery powered magnetically mountable portable camera, can be positioned near the viewing hole and connected wirelessly or in a wired configuration to a monitor, thereby allowing the operator to view the install, test, or remove operation through the view hole from a completely different room away from the hazardous arc flash zone, while simultaneously remotely operating the robotic tool and the equipment using the remote switch operator.

In embodiments, the beams can each have channels on each side. Each beam can have a top beam channel that can slidably engage each of the handles or another component. Each beam can have a side channel that can engage a mounting bracket for the solenoid. Each beam can have a bottom channel that can engage another component. All components engaged within the channels can be held within the perimeter of the frame.

Each of the beams can engage opposite ends of the bar. The bar can connect to the beams in the channels for quick release and reconfiguration of the robotic tool for different sized switch gear, larger motors, bigger solenoids, or smaller solenoids with thinner or fatter plungers.

The beam channels can be used to adjustably engage each side support, allowing for quick change outs of equipment and enhancing the versatility and flexibility of the robotic tool.

Additional support to the frame can be added in the form of support gussets that can adjustably engage each side beam channel or can be fastened to the beams without channels to reinforce the frame.

Each side support can be a one piece structure and can be L-shaped, or can be two connected pieces of plate metal forming the L-shape. The side supports can be flat plates. The L-shape can add durability to the robotic tool preventing the frame from shattering, such as if the robotic tool is dropped from a height.

To keep the robot lightweight and low cost to ship, the frame can be entirely formed from aluminum. In embodiments, the frame can be made from hollow aluminum bars.

The robotic tool can be operated by a remote switch operator that provides signals and power without needing to be attached to a wall outlet of a facility. The power can be DC 12 volt power. The signals can include: install, remove, on, off, increase rotation speed (up), and decrease rotation speed (down). The rate of rotation can be displayed to an operator using the remote switch operator.

In embodiments, the motor mount plate of the robotic tool can have an S-shape or another "tri" or three face shape, such as the shape of a chair with a straight back connected to a flat seat which is connected to straight legs, wherein the straight back and straight legs can be formed of metal having faces in parallel planes.

The power plate can have an L-shaped configuration. The interface plug can be positioned and affixed on one face of the L-shaped configuration, and the solenoid can be positioned and affixed on a second face of the L-shaped configuration. The solenoid and the interface plug can be easily removed and replaced if maintenance warrants replacement. A feature of the robotic tool is that it can be easily maintained.

In embodiments, the solenoid can be mounted to a solenoid plate. The solenoid plate can add rigidity and stability to the moving solenoid component attached to the frame. The solenoid plate can be fastened to the second face of the L-shaped configuration. The solenoid signal and power cord can engage a terminal on the solenoid which can connect directly to the solenoid.

In embodiments, the alignment tool of the gear assembly can have at least two wings to facilitate turning of the rotatable shaft for ensuring alignment.

A remote switch operator can be used as the signal source and power supply for the robotic tool.

The remote switch operator can be used to control the tool and provide power to the tool without the need for attaching the robotic tool to a wall power socket, which can create a tripping hazard with the cords.

A remote switch operator can have a rugged, water-resistant, and impact-resistant housing, such as a sturdy plastic or urethane based housing. The remote switch operator can be controlled by the operator by using a wireless connection to a remote controller or using a wired connection from the remote controller to the housing of the remote switch operator.

The housing of the remote switch operator can have a body, which can further have a closeable lid that can be hinged to the body and latched to the body or otherwise attached with fasteners to secure the lid over the body in a closed and generally watertight position.

Two face plates can be mounted in the body. A first face plate can have a power plug, an install momentary push button, a remove momentary push button, an on-off switch, a circuit breaker, a DC power plug, and an auxiliary push button.

The second face plate mounted within the housing adjacent the first face plate can support a current controller connected to the circuit board beneath the first face plate for controlling the amount of power to the motor via the motor control housing from the remote switch operator and to give signals for the motor to rotate in an install direction, rotate in a remove direction, turn on, turn off, increase a predefined amp setting (up button), or decrease a predefined amp setting (down).

The remote switch operator can communicate from the housing to the robotic tool with an interface cable that can provide power from the batteries in the remote switch operator and signals from the current controller.

The current controller can present a display to an operator. On the face plate, the display can indicate a status of the controlling by the current controller such as the upper preset amperage limit, wherein if the robotic tool exceeds that limit, the current controller can shut off the robotic tool.

The up button can allow the current controller to increase the predefined amp setting which can control when the motor is automatically shut down by the current controller. The down button can allow the current controller to decrease amps, reducing the predefined amp setting for when the motor is automatically shut down by the current controller.

The install button can permit the current controller to set an amount of current needed to install the electrical equipment, such as 23 amps.

The remove button can allow the current controller to set an amount of current needed to remove the electrical equipment, such as 19 amps.

The install, remove, and auxiliary push buttons and on-off switch of the first face plate can communicate directly to a circuit board located in the body beneath the first face plate.

These buttons and switches of the first face plate can actuate a first and/or second relay in communication with at least one battery that can be supported in the housing on a mounting bracket.

A battery charger can be mounted within the body near the at least one battery and connected to the DC power plug that can engage a DC power source for charging the at least one battery in the housing. The battery can be a twelve volt battery or two or more batteries adding up to 12 volts.

The motorized remotely controllable framed racking tool can be operated on electrical equipment, such as a low voltage circuit breaker up to 1000 volts, a medium voltage circuit breaker with voltages between 1000 and 20 kV, a switch gear, a motor control center, or a contactor.

In embodiments, the first and second side supports can be L-shaped metal plates with lengths from about 12 to 26 inches and a right angle side having a width of about 3 inches.

A power plate of the frame can be formed from ¼ inch plate steel and can have a triangular or rectangular shape.

The overall frame with motor, gear box, and magnets can have a width from about 8 inches to about 24 inches, a height from about 6 inches to about 30 inches, a depth from about 3 inches to about 8 inches, and can weigh less than 80 pounds.

In embodiments, only the magnets contact the metal surface around the switch gear.

The rotatable shaft can be a solid metal rod with a diameter from about 2 inches to about 8 inches and can fit within the gear box. The rotatable shaft can be a hollow metal rod surrounded by an insulator, such as a plastic or a urethane.

The remote switch operator current controller can have memory means that can contain computer instructions that instruct a microprocessor on the circuit board to automatically shut off the robotic tool when the robotic tool exceeds a preset amperage.

The current controller can have a current controller circuit board disposed on an aluminum plate with a membrane overlay. Four engagement positions and a digital display can be formed in the membrane overlay.

A current controller can have a microprocessor connected to the engagement positions and a current controller flash memory. Additional computer instructions in the flash memory of the current controller can compare data supplied by the communication cable attached to the motor to a predetermined threshold installed in the current controller flash memory.

A portable camera with a magnetic mounting can be used to monitor the viewing hole, allowing continuous supervision of the coupling from a remote location using a client device connected to a network. The portable camera can be battery operated and can provide a digital image that has a dpi of 800×520. The camera can have light emitting diodes to illuminate the viewing area.

The solenoid can have a solenoid plunger removably connected to the solenoid for engaging the interlock button of the switch gear through the solenoid hole.

One or more embodiments relate to a method for racking electrical equipment that includes the steps of connecting a portable motorized racking tool to a remote switch operator.

Next, the method can include attaching a first end of a torque limiting clutch to a rotatable shaft in a gear box of the portable motorized racking tool. The gear box can have a gear assembly of the rotatable shaft connected to a coupling that engages a torque limiting clutch.

The method can include setting a current controller in the remote switch operator to a predetermined amp setting.

The method can include the operator physically aligning the coupling with electrical equipment needing maintenance, removal, or installation, while simultaneously attaching a frame portion of the motorized racking tool to a metal surface adjacent the electrical equipment.

The method can include using a remote controller outside the perimeters of the arc flash hazard zone. The remote controller can cause the remote switch operator to flow signals and power into an interface plug on the tool.

The method can include transmitting the data and signals from the interface plug to both the solenoid and the motor control housing simultaneously.

The method can include using the solenoid to actuate an interlock button on the electrical equipment after the motor can rotate the gear assembly in the gear box in a first direction, allowing an operator to safely remove electrical components or allowing for safe service to the electrical equipment to remotely disconnect or remotely install equipment, while the operator is outside the perimeters of the arc flash hazard zone.

The method can include remotely disconnecting the electrical equipment. The solenoid plunger can push in an interlock button on the electrical equipment to allow the coupling to rotate in a first direction to a test position. Once the test position is achieved, the solenoid plunger can push the interlock button a second time to allow the coupling to continue rotation in the first direction to a disconnect position.

To remotely reconnect the electrical equipment after performing service, the method can include using the solenoid plunger to push the interlock button on the switch gear to permit the coupling to rotate in a second direction to the test position. Once the connection is tested, the interlock button can be pushed again by the solenoid plunger allowing the coupling to continue in the second direction to a connect position, thereby completing installation of electrical equipment by an operator outside an arc flash hazard boundary.

Figure 1:
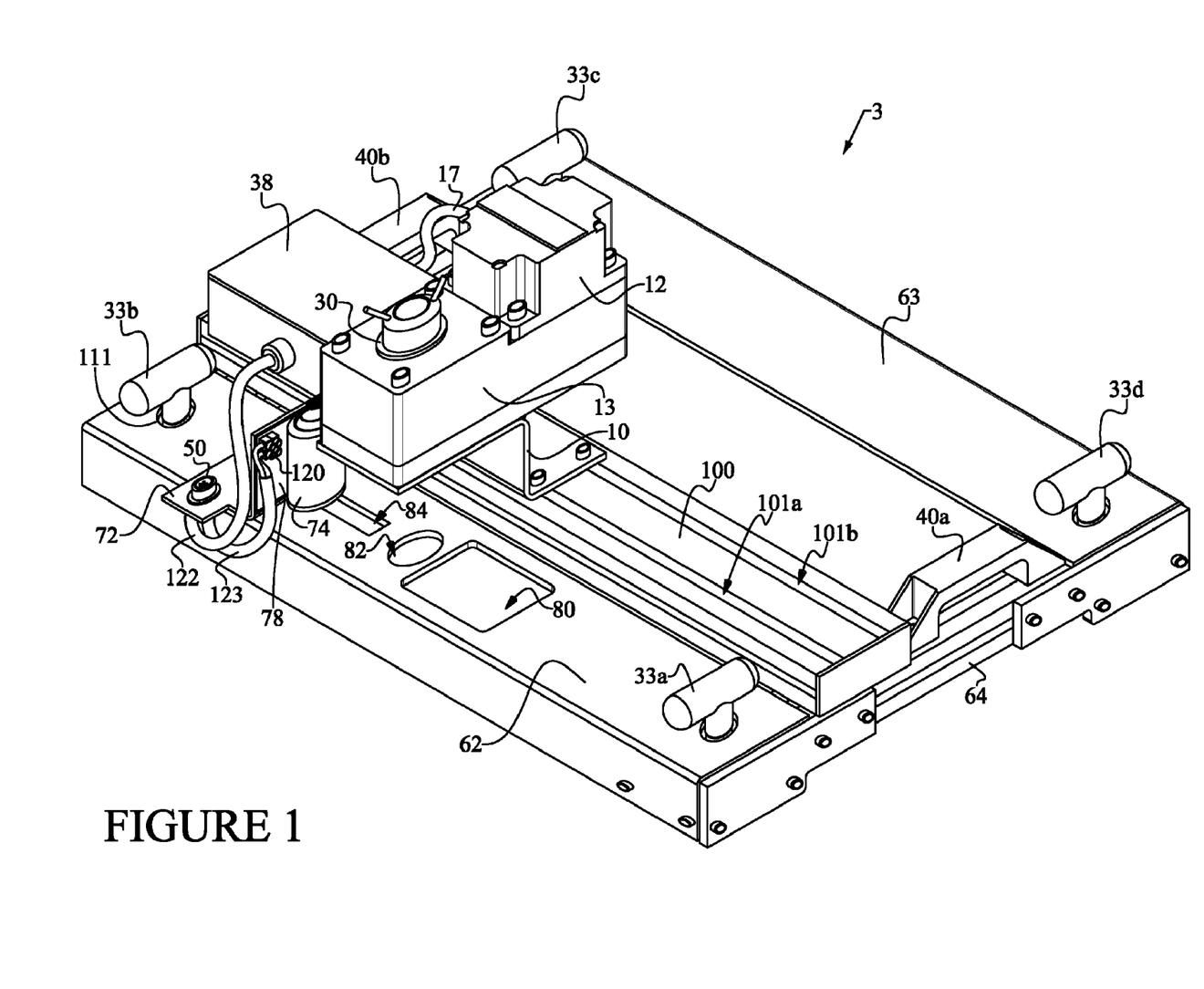
FIG. 1 is a perspective top view of the remotely operable portable framed remote racking tool.

Turning now to the Figures, FIG. 1 is a perspective top of the portable framed racking tool.

The portable motorized racking tool 3 can have a motor mount plate 10 for supporting a motor 12. The motor 12 can operate a gear assembly 30 in a gear box 13.

The motor 12 can be connected to an interface plug 50 mounted to a power plate 72 through a communication cable 17.

The frame, which can be assembled without the motor, can have a first side support 62 and a second side support 63 opposite the first side support.

A first beam 64 can connect the first side support 62 and the second side support 63.

A bar 100 can be secured parallel to the first side support 62 that can removably and slidable engage the motor mount plate 10. The bar 100 can have top channels 101*a* and 101*b*.

The magnets can be attached to the bottom side of the frame in magnetically shielded magnet housings. The magnets can be formed as handles 33a, 33b, 33c, and 33d for rotating and engaging magnet faces with the metal surface.

Also depicted is a large viewing hole 80 or "view hole", a tool hole 82, and a solenoid hole 84.

The solenoid plunger can penetrate through the solenoid hole 84 to operate the interlock button of the circuit breaker or switch gear.

The communication cable 17 can provide communication between the motor control housing 38 and the motor 12.

The motor control housing 38 can connect to the interface plug 50 using a signal and power cord 122. A solenoid signal power cord 123 can extend from the interface plug 50 and engage a terminal 120 on a solenoid 74 on a solenoid plate 78.

The solenoid signal and power cord 122 can operate the solenoid 74.

The magnet handle 33b can penetrate a magnet handle hole 111 to engage the magnet and rotate the magnet face outward to engage the metal surface. The magnet handle 33b can rotate the magnet back when the frame needs to be disengaged from the metal surface.

The first handle 40a and the second handle 40b are also shown. Each handle can be removably fastened to a beam.

Figure 2:
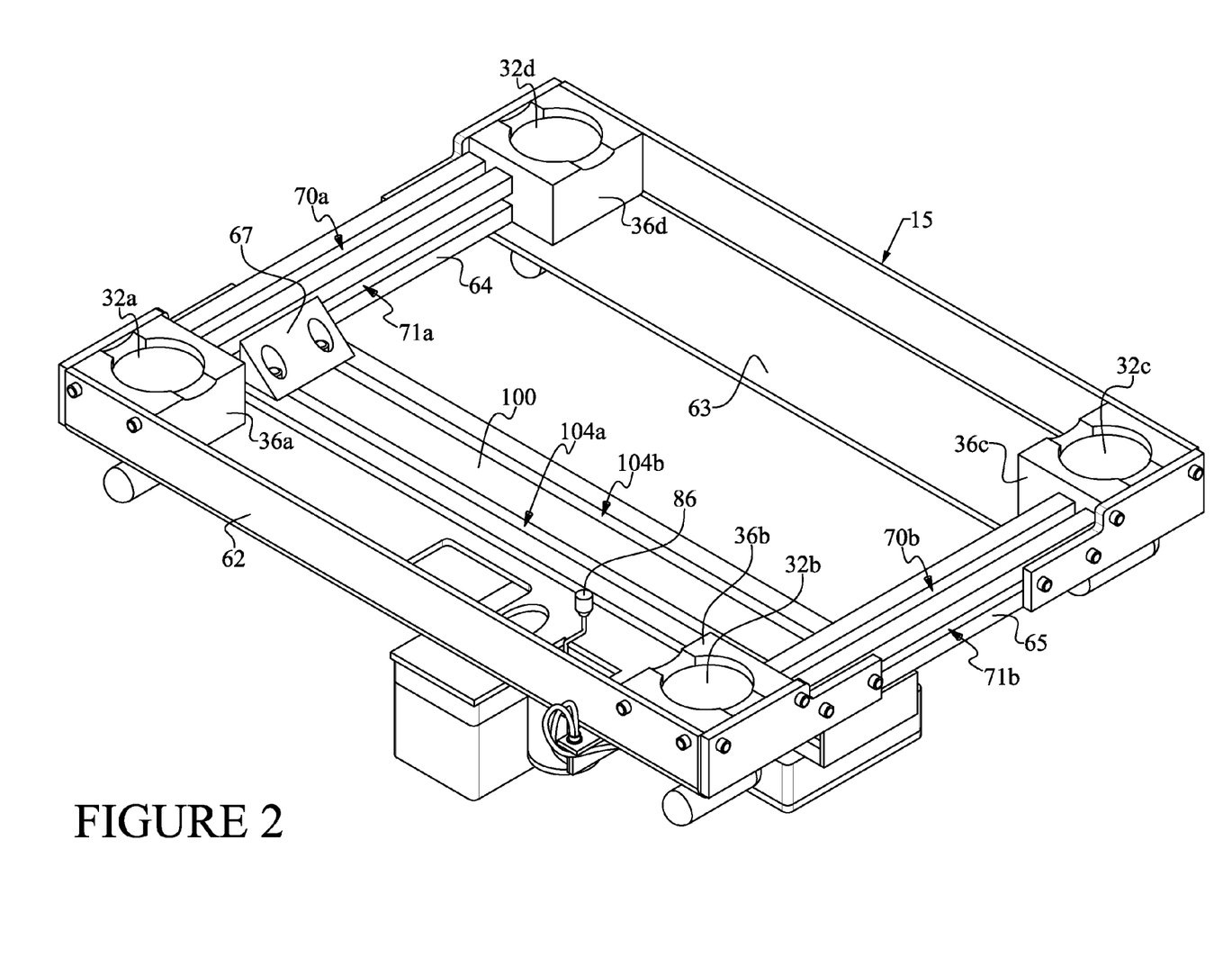
FIG. 2 is a bottom perspective view of the remotely operable portable framed remote racking tool.

FIG. 2 is a bottom perspective view of the portable motorized racking tool.

The frame 15 can have a first side support 62 and a second side support 63 opposite the first side support. The frame 15 can have a first beam 64 and a second beam 65, which can be from about 12 to about 24 inches in length, from about 1 inch to about 4 inches in width, and can be made of a hollow aluminum channel.

The solenoid plunger 86 can engage interlock buttons on the switch gear.

Magnet faces 32a, 32b, 32c, and 32d can be seen along with the magnetically shielded magnet housings 36a, 36b, 36c, and 36d.

The bar can have two bottom channels identified as channels 104a and 104b.

The first and second beams can have channels 70a, 70b, 71a, and 71b for removably and slidably engaging other components.

The first beam 64 can be fastened between the magnetically shielded magnet housings 36a and 36d, and the magnetically shielded magnet housings can be secured to the interior of the L-shaped side supports.

Support gusset 67 can be seen connecting to both the beam 64 and the bar 100 simultaneously to reduce vibration and improve overall frame strength in case of impact.

In one or more embodiments, the motor mount plate can have at least three faces in an integral structure, like an "S" shape.

Figure 3:
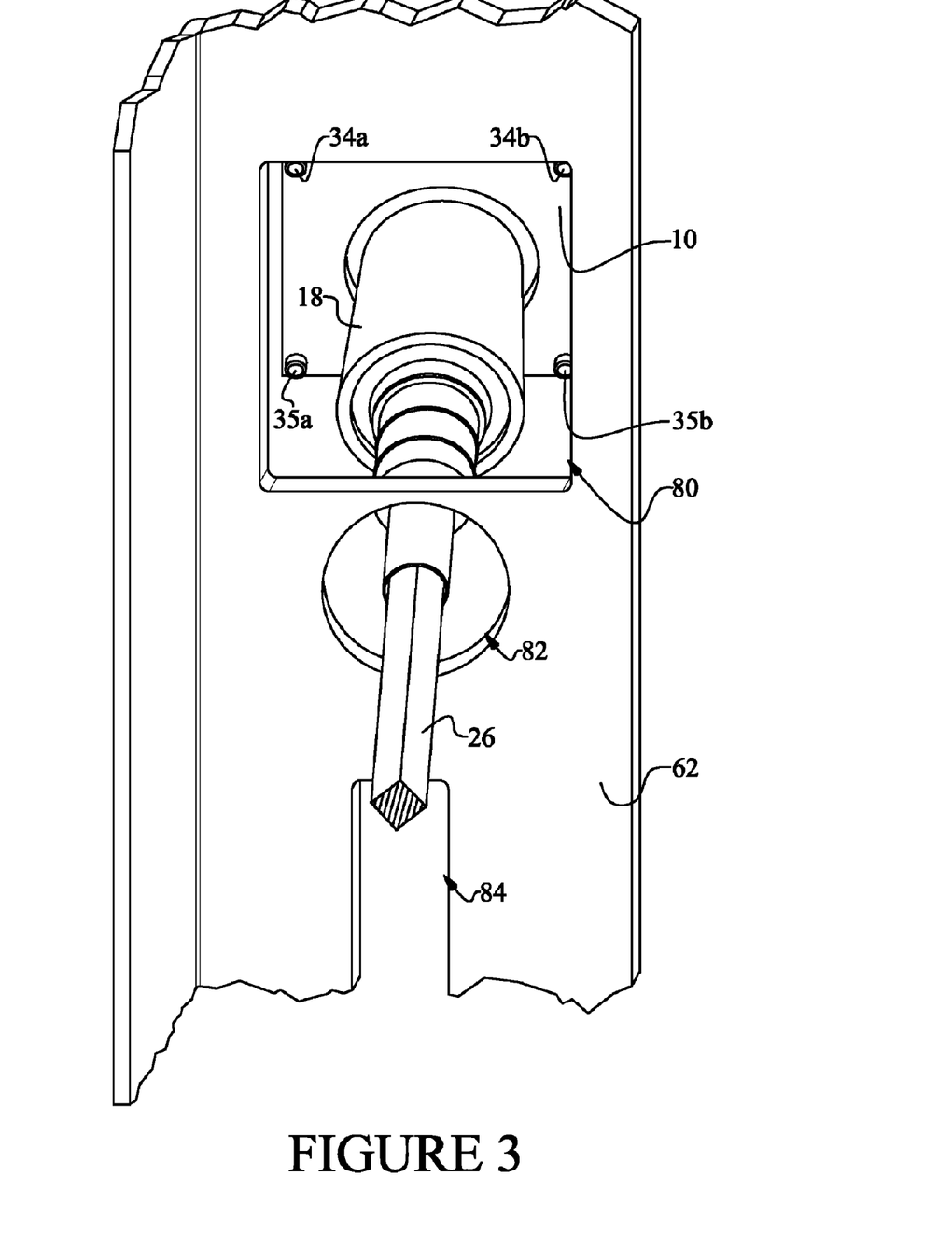
FIG. 3 is a view through the viewing hole and tool hole of the remotely operable portable framed remote racking tool.

FIG. 3 is a view through the viewing hole 80 and a view through a tool hole 82 of the first side support 62.

The removable torque limiting clutch 18 can be viewed attached to a coupling 26 that can engage a universal tool.

The fasteners 34a, 34b, 35a, and 35b can hold the gear box with the gear assembly to the motor mount plate 10.

The viewing hole 80, the tool hole 82, and the solenoid hole 84 can be centrally positioned in the first side support and disposed in a line with each other. However, in one or more embodiments, the holes are not centrally positioned. The tool hole and the viewing hole can be in close proximity, as the viewing hole can be used to see that the tool is in alignment with the electrical equipment.

Different configurations of the holes are possible, for example the holes can be grouped differently, sized differently, and can have different shapes.

Figure 4:
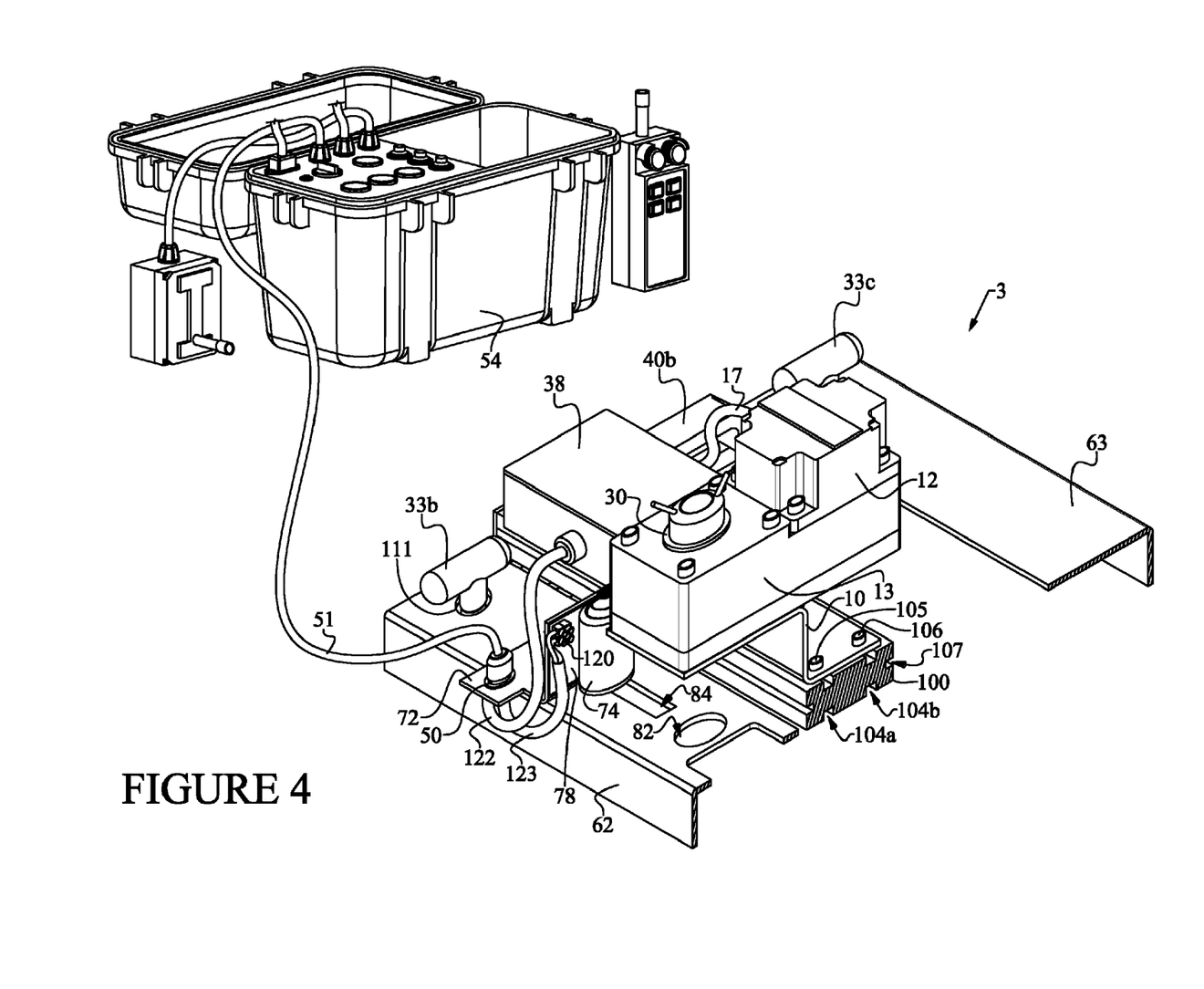
FIG. 4 is a view of the device with a remote switch operator.

FIG. 4 shows the interface plug 50 connected to the interface cable 51 that further engages the remote switch operator 54 that controls and supplies power to the portable motorized racking tool.

The power plate 70 is shown with a signal and power cord 122 connected to the motor control housing 38. The power plate 70 also can have a solenoid signal power cord 123 connected to a terminal 120.

The portable motorized racking tool 3 can have a first side support 62 and a second side support 63.

The magnet handles 33b, 33c are shown. The magnet handle 33b can protrude through the magnet handle hole 111.

The solenoid plate 78 can add strength to the assembly and can prevent deformation of the support plates when the solenoid 74 operates its plunger through the solenoid hole 84. A tool hole 82 is also depicted.

The bar 100 can have a first bar side channel 107. The bar 100 can have two bottom bar channels 104a, 104b and a second bar side channel.

The first sliding channel fastener 105 and the second sliding channel fastener 106 can hold the motor mount plate 10 to the bar 100. The gear box 13 can rest on the motor mount plate 10. The motor 12 can sit on top of the gear box 13. The gear box 13 can also have a gear assembly 30.

The channels can enable the robotic tool to be configured differently, with larger motors if needed. During manufacture, the basic design can be variable, versatile, and easy to reconfigure without the need for complex machinery.

A communication cable 17 is shown next to the second magnet handle 40b.

Figure 5:
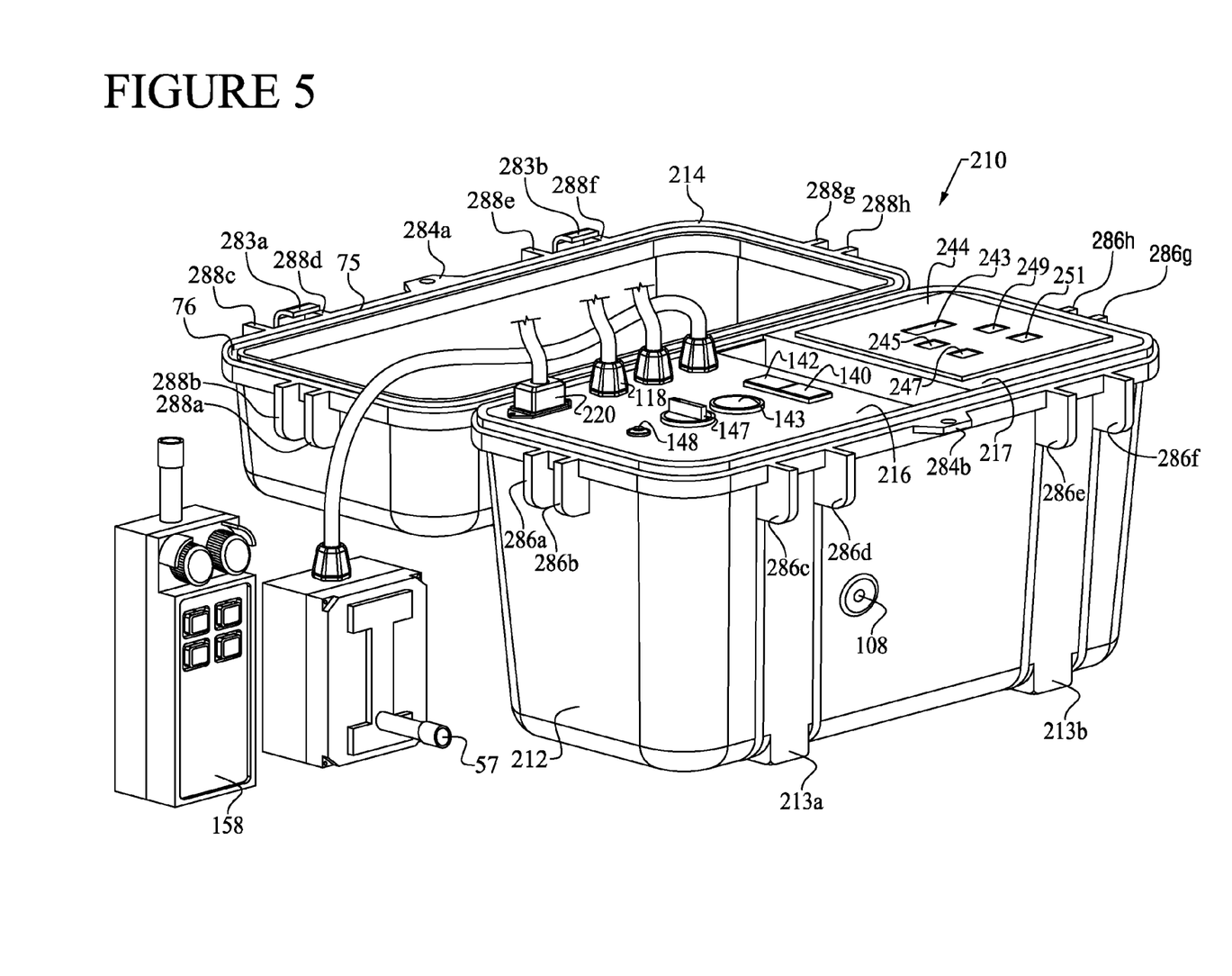
FIG. 5 is a view of the remote switch operator.

FIG. 5 is a view of a remote switch operator 210, or RSO 210 usable herein.

The RSO 210 can have a first face plate 216 and a second face plate 217.

The RSO 210 can have a lid 214 that can engage a body 212.

A power plug 118 can power the portable motorized racking tool, and a DC plug 220 can charge the batteries in the housing beneath the first face plate.

An install momentary push button 140, a remove momentary push button 142, an on/off switch 147, a circuit breaker 148, and an auxiliary button 143 can be disposed in the first face plate 216.

A current controller 244 having a display 243, an up button 245, a down button 247, an install button 249, and a remove button 251 can be disposed in the second face plate 217.

A space can be disposed between the first face plate 216 and the second face plate 217. A wall of plastic can run down each face plate enclosing the space beneath each face plate to provide a water tight seal.

An antenna can protrude from the space for wireless communication with the portable motorized racking tool.

The lid 214 can have a plurality of lid ribs for added deformation resistance and rigidity shown as lid ribs 288a, 288b, 288c, 288d, 288e, 288f, 288g and 288h.

The lid 214 can have a groove 75 for holding a seal 76, such as a gasket, enabling the lid to be sealed to the body 212 in a watertight or waterproof connection.

The lid 214 can have latches 283a and 283b that can engage a lip on the body. The body 212 can have a connector 284b that can engage a connector 284a on the lid 214.

The body 212 can have a pressure relief valve 108 allowing air to escape when the electronics under the face plates heat over ambient temperatures.

In embodiments, a wireless remote controller 158 or a wired remote controller 57 can signal the remote switch operator to provide power and control signals.

The body can have feet 213a and 213b for keeping the housing off a wet surface.

Figure 6:
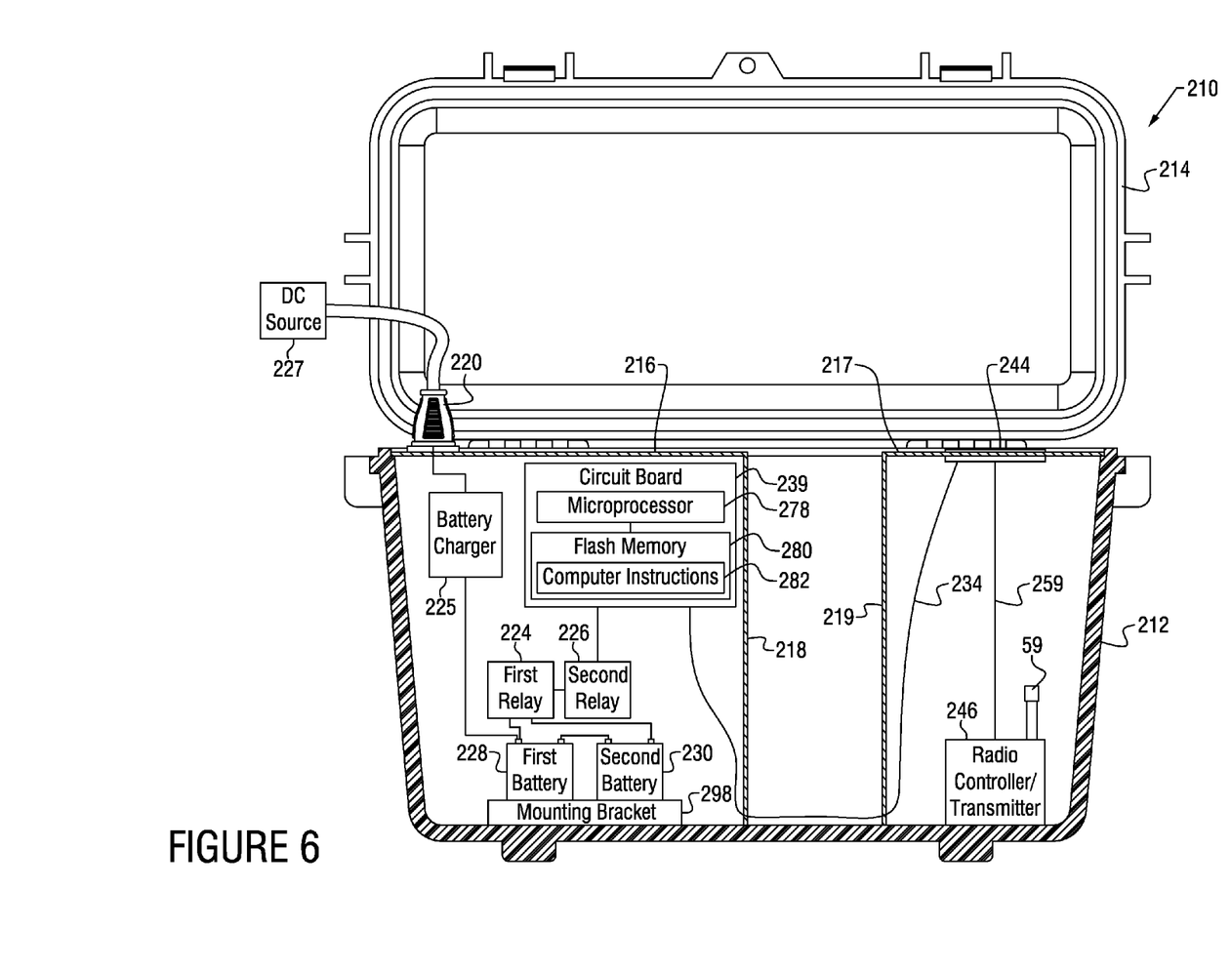
FIG. 6 is a view of the components inside of the remote switch operator.

FIG. 6 is a diagram of electronics of the remote switch operator 210.

The remote switch operator 210 can have a lid 214 and a body 212.

The DC plug 220 is shown engaging a cord that provides power to the remote switch operator from a remote power supply, here shown as a DC source 227.

An antenna 59 can be connected to a receiver/transmitter 246 beneath the current controller.

Beneath the first face plate 216 can be a circuit board 239 that can communicate with a first relay 224 and a second relay 226. The relays can connect to a first battery 228 and a second battery 230 which can be supported on a mounting bracket 298.

The circuit board 239 can support a microprocessor 278 with a flash memory 280 and computer instructions 282 for comparing data to preset limits.

A battery charger 225 can connect to the DC power plug 220.

The first face plate 216 can have a side 218, and the second face plate 217 can have a side 219.

A signal cable 259 can send signals from the current controller 244 to the radio controller/transmitter 246.

The current controller power cable 234 can engage the current controller 244 with the circuit board 239.

Figure 7:
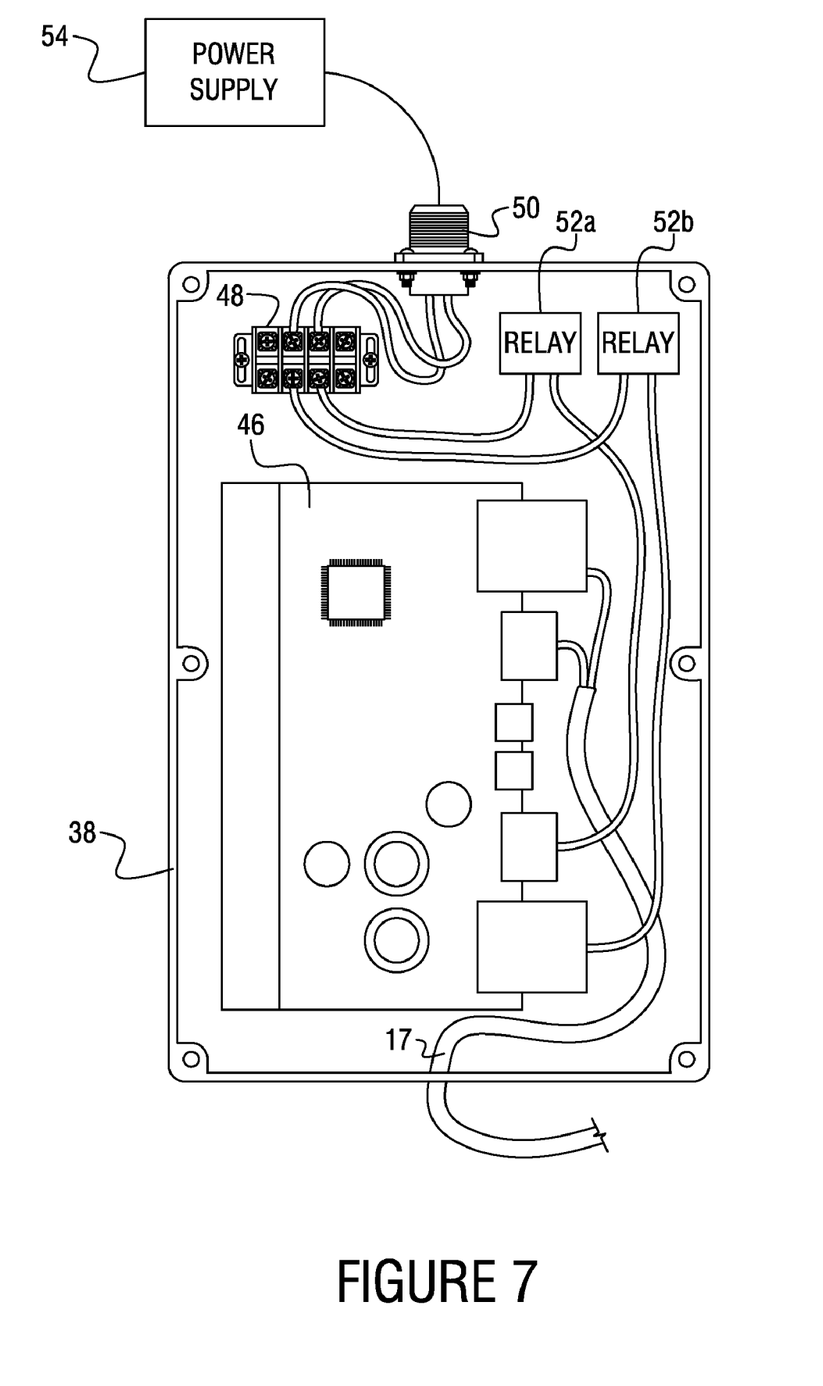
FIG. 7 is a diagram of electronics in the motor control housing of the tool.

FIG. 7 is a diagram of the electronics in the motor control housing 38. The motor control housing 38 can have a connector 48 that can communicate to two relays 52a and 52b that can engage the motor control circuit board 46.

The communication cable 17 can be disposed in the motor control housing 38. Power can be supplied to the motor control housing 38 from the remote switch operator or a power supply 54.

Figure 8:
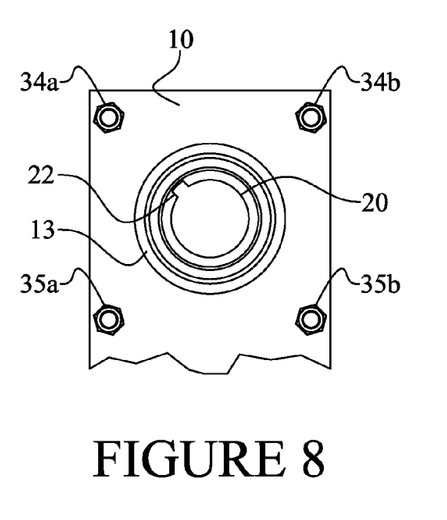
FIG. 8 is a detail front view of the gear box key way.

FIG. 8 is a detail front view of the gear box key way. The motor mount plate 10 with the gear box 13 can have a shaft housing 20 and a key way 22. The motor mount plate can have a plurality of fasteners 34a, 34b, 35a, 35b.

Figure 9:
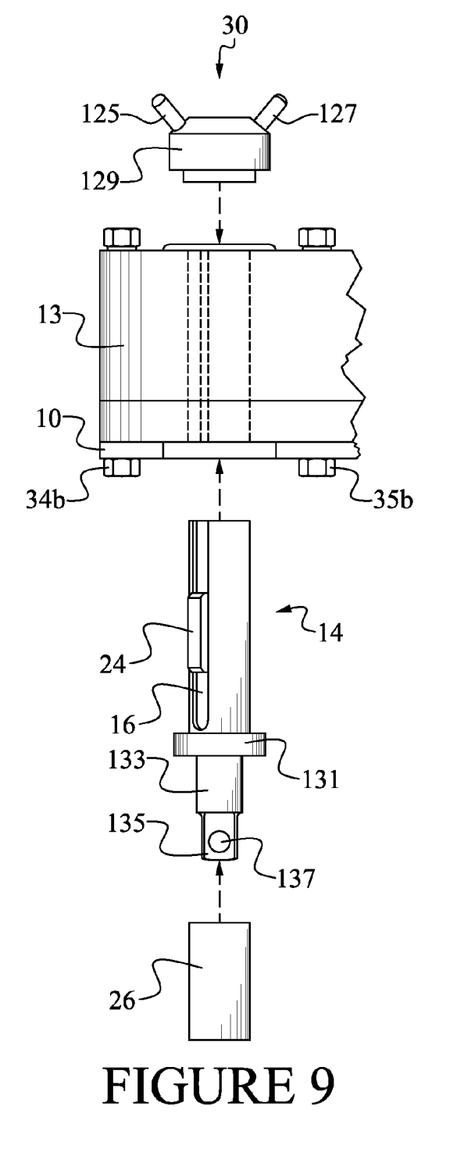
FIG. 9 is an exploded side view of the gear assembly.

FIG. 9 is an exploded side view of the gear assembly usable herein.

The gear assembly 30 can include a coupling 26 that can attach to a latch 135 with a latching mechanism 137, which can be a spring loaded ball. The coupling 26 can be a removable replaceable clutch.

An extension 133 can be connected to the latch 135. The extension 133 can have a stop 131 with a diameter wider than the extension, such that the clutch can not move past the stop.

The rotatable shaft 14 can have a shaft key way 16 and a key 24 that can engage the gear box. The rotatable shaft 14 can be connected to the motor mount plate 10 of the gear box 13. The fasteners 34b, 35b connect the motor mount plate 10 to the gear box 13.

An alignment tool 129 with a first wing 125 and a second wing 127 can rotatably align the latch on the clutch.

Figure 10:
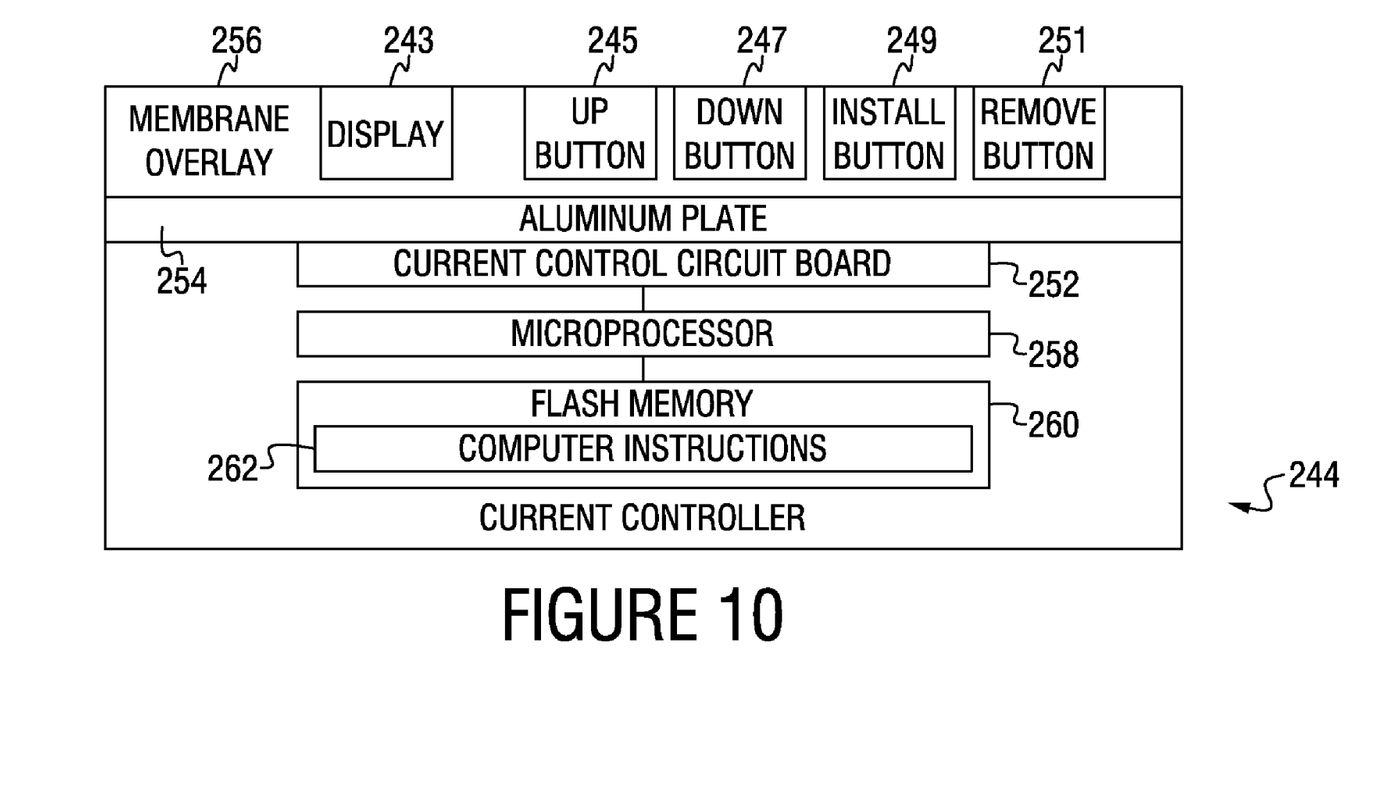
FIG. 10 is a diagram of the electronics of a current controller.

FIG. 10 is a diagram of electronics of a current controller 244. A membrane overlay 256 can be disposed over an aluminum plate 254. The membrane overlay 256 can have a display 243, an up button 245, a down button 247, an install button 249, a remove button 251, and a current control circuit board 252. A microprocessor 258 can be in communication with the current control circuit board and a flash memory 260 with computer instructions 262.

Figure 11:
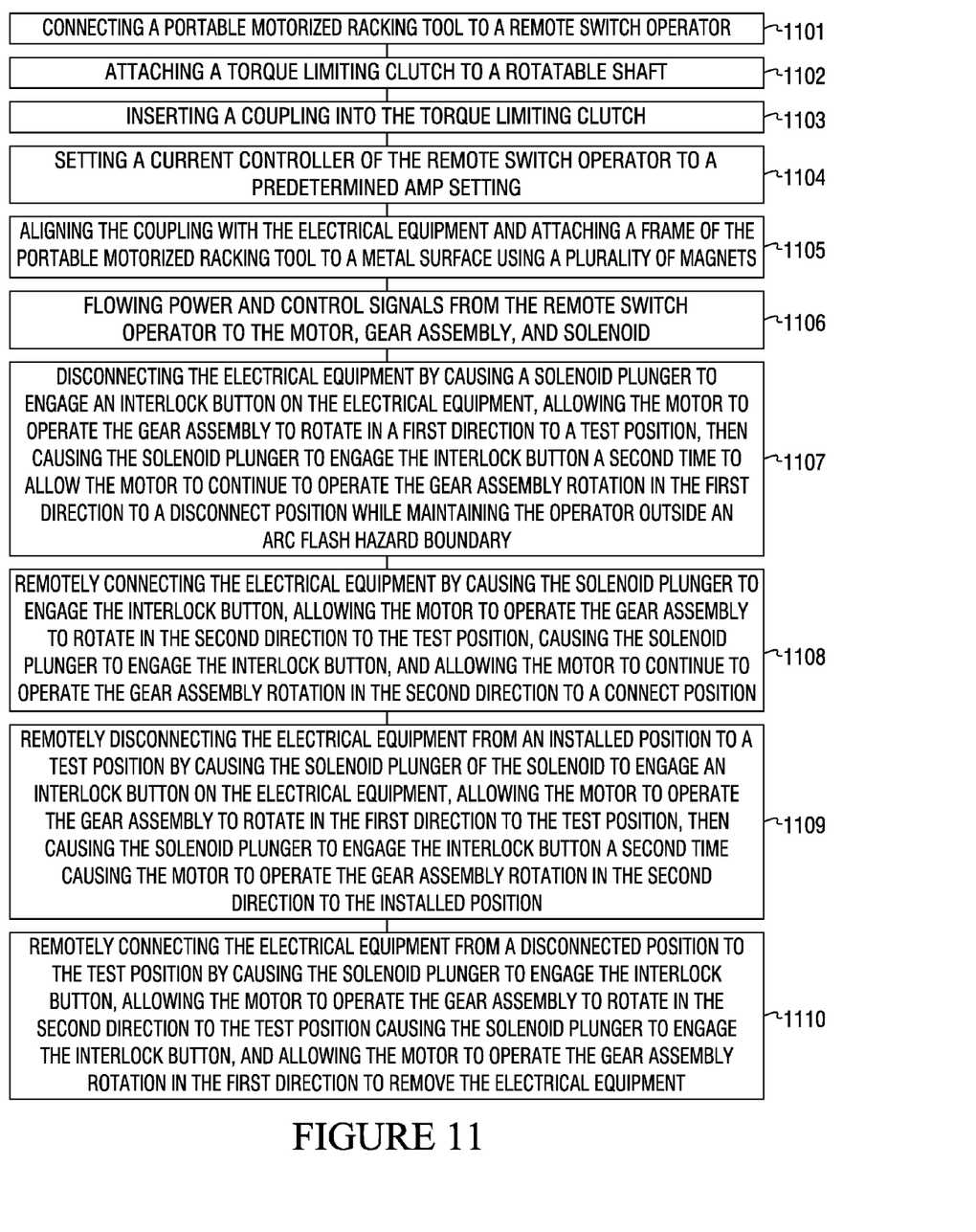
FIG. 11 is an embodiment of a method for removing or installing electrical equipment.

FIG. 11 depicts an embodiment of a method for racking electrical equipment.

The method can include connecting a portable motorized racking tool to a remote switch operator, as illustrated by box 1101.

The method can include attaching a torque limiting clutch to a rotatable shaft, as illustrated by box 1102.

The method can include inserting a coupling into the torque limiting clutch, as illustrated by box 1103.

The method can include setting a current controller of the remote switch operator to a predetermined amp setting, as illustrated by box 1104.

The method can include aligning the coupling with the electrical equipment and attaching a frame of the portable motorized racking tool to a metal surface using a plurality of magnets, as illustrated by box 1105.

The method can include flowing power and control signals from the remote switch operator to the motor, gear assembly, and solenoid, as illustrated by box 1106.

The method can include disconnecting the electrical equipment by causing a solenoid plunger to engage an interlock button on the electrical equipment, allowing the motor to operate the gear assembly to rotate in a first direction to a test position, then causing the solenoid plunger to engage the interlock button a second time to allow the motor to continue to operate the gear assembly rotation in the first direction to a disconnect position while maintaining the operator outside an arc flash hazard boundary, as illustrated by box 1107.

The method can include remotely connecting the electrical equipment by causing the solenoid plunger to engage the interlock button, allowing the motor to operate the gear assembly to rotate in the second direction to the test position, causing the solenoid plunger to engage the interlock button, and allowing the motor to continue to operate the gear assembly rotation in the second direction to a connect position, as illustrated by box 1108.

The method can include remotely disconnecting the electrical equipment from an installed position to a test position by causing the solenoid plunger of the solenoid to engage an interlock button on the electrical equipment, allowing the motor to operate the gear assembly to rotate in the first direction to the test position, then causing the solenoid plunger to engage the interlock button a second time causing the motor to operate the gear assembly rotation in the second direction to the installed position, as illustrated by box 1109.

The method can include remotely connecting the electrical equipment from a disconnected position to the test position by causing the solenoid plunger to engage the interlock button, allowing the motor to operate the gear assembly to rotate in the second direction to the test position causing the solenoid plunger to engage the interlock button, and allowing the motor to operate the gear assembly rotation in the first direction to remove the electrical equipment, as illustrated by box 1110.

While these embodiments have been described with emphasis on the embodiments, it should be understood that within the scope of the appended claims, the embodiments might be practiced other than as specifically described herein.

What is claimed is:

1. A portable motorized racking tool for removing or installing electrical equipment by an operator, wherein the electrical equipment is surrounded by a metal surface outside an arc flash hazard boundary, wherein the portable motorized racking tool comprises:

a. a frame comprising:
     (i) a first side support, a second side support opposite the first side support, a first beam disposed between the first side support and the second side support, and a second beam disposed between the first side support and the second side supports opposite the first beam; and
     (ii) a viewing hole, a tool hole, and a solenoid hole formed in the first side support, the second side support, the first beam, or the second beam;
   b. a power plate mounted to the first side support, the second side support, the first beam, or the second beam, wherein the power plate supports an interface plug for engaging a power supply, wherein a solenoid signal and power cord connect the interface plug to a solenoid with a solenoid plunger, and wherein the interface plug connects to a motor control housing a signal power cord;

c. a plurality of removable magnetically shielding magnet housings fastened to the frame;
d. at least one extending and retracting magnet having a magnet handle, wherein the extending and retracting magnet is disposed within each removable magnetically shielding magnet housing for magnetically connecting the frame to a metal surface;
e. a bar adjacent the first side support or the second side support, wherein the bar is adjustably and removably connected to the first beam and the second beam;
f. a motor mount plate adjustably and removably attached to the bar;
g. a motor with a gear box fastened to the motor mount plate, wherein the motor engages a signal and power cord, and wherein the gear box has a keyway and a shaft housing;
h. a communication cable connecting the motor control housing with the motor; and
i. a gear assembly for engaging the keyway, wherein the gear assembly comprises:
  (i) a rotatable shaft disposed through the gear box;
  (ii) a shaft key way formed in the rotatable shaft;
  (iii) a key housed in the shaft key way to engage the keyway to allow the rotatable shaft to lock into the shaft housing;
  (iv) an extension formed on one end of the rotatable shaft;
  (v) a stop disposed between the extension and the rotatable shaft, wherein the stop has a diameter larger than the extension and the rotatable shaft;
  (vi) a latch formed in an opposite end of the extension, wherein the latch has a latch mechanism for engaging a coupling; and
  (vii) an alignment tool for engaging the rotatable shaft and turning the coupling to align the coupling with the electrical equipment, wherein the solenoid plunger passes through the solenoid hole to depress and release an interlock button on electrical equipment, which allows the motor to rotate the rotatable shaft with the coupling through the tool hole to engage the electrical equipment, while an operator is remotely viewing the electrical equipment through the viewing hole.

2. The portable motorized racking tool of claim 1, wherein each beam comprises a top beam channel slidably engaging at least one handle and one end of the bar, and wherein each beam channel engages each side support.

3. The portable motorized racking tool of claim 2, wherein each beam channel engages at least one support gusset.

4. The portable motorized racking tool of claim 2, wherein each side support comprises a one piece structure.

5. The portable motorized racking tool of claim 1, wherein the beams, the side supports, or combinations thereof, are aluminum.

6. The portable motorized racking tool of claim 5, wherein the beams and the side supports are hollow.

7. The portable motorized racking tool of claim 1, wherein the power supply is a remote switch operator.

8. The portable motorized racking tool of claim 1, wherein the motor mount plate has a chair shape, an S-shape, or a tri-face shape.

9. The portable motorized racking tool of claim 1, wherein a clutch is removable and interchangeable with the rotatable shaft.

10. The portable motorized racking tool of claim 9, wherein the clutch is a one piece structure.

11. The portable motorized racking tool of claim 1, wherein the power plate simultaneously engages one of the beams and one of the side supports to reduce vibration.

12. The portable motorized racking tool of claim 1, wherein the solenoid is mounted to a solenoid plate that is fastened to the motor mount plate, and wherein the solenoid signal and power cord engages a terminal connected to the solenoid.

13. The portable motorized racking tool of claim 1, wherein the alignment tool comprises at least one wing for turning the rotatable shaft for alignment purposes.

14. The portable motorized racking tool of claim 1, wherein the power supply comprises a remote switch operator, wherein the remote switch operator comprises:
  a. a housing with a body and a closable lid;
  b. a first face plate within the housing, wherein the first face plate comprises a power plug, an install momentary push button, a remove momentary push button, an on-off switch, a circuit breaker, a DC power plug, and an auxiliary push button;
  c. a circuit board beneath the first face plate engaged with at least one relay that engages at least one battery connected to the DC power plug for connecting to a DC power source to charge the at least one battery;
  d. a second face plate within the housing adjacent the first face plate, wherein the second face plate comprises a current controller;
  e. an interface cable for engaging the interface for providing power and signals from the current controller;
  f. a current controller power cable for engaging the current controller with the circuit board, and a current controller signal cable for engaging the current controller with the circuit board; and
  g. a receiver/transmitter connected to the current controller for providing control signals and controlled power to a remote controller, wherein the remote controller remotely actuates the remote switch operator, wherein the remote switch operator actuates the portable motorized racking tool.

15. The portable motorized racking tool of claim 1, wherein the electrical equipment is a low voltage circuit breaker using up to 1000 volts, a medium voltage circuit breaker between 1000 volts to 20000 volts, a switch gear, a motor control center, or a contactor.

16. The portable motorized racking tool of claim 14, wherein the current controller comprises:
  a. a current controller circuit board with at least four engagement positions including: up, down, install, and remove;
  b. at least one digital display; and
  c. a current controller microprocessor connected to each engagement position, wherein the current controller microprocessor has a current controller flash memory with computer instructions for comparing data.

17. The portable motorized racking tool of claim 1, further comprising a portable camera with a magnetic mounting for monitoring through the viewing hole to allow viewing of the electrical equipment from a remote location.

18. A portable motorized racking tool for removing or installing electrical equipment by an operator, wherein the electrical equipment is surrounded by a metal surface outside an arc flash hazard boundary, wherein the portable motorized racking tool comprises:
  a. a frame comprising:
    (i) a first side support, a second side support opposite the first side support, a first beam disposed between the first side support and the second side support, and a second beam disposed between the first side support and the second side support opposite the first beam; and
    (ii) a viewing hole, a tool hole, and a solenoid hole formed in the first side support, the second side support, the first beam, or the second beam;

b. an interface plug mounted to the first side support, the second side support, the first beam, or the second beam for engaging a power supply, wherein the interface plug connects to a solenoid with a solenoid plunger using a solenoid signal and power cord, and wherein the interface plug connects to a motor control housing a signal power cord;
c. at least one extending and retracting magnet disposed through the frame for magnetically connecting the frame to a metal surface around electrical equipment;
d. a bar adjacent one of the side supports, wherein the bar is adjustably and removably connected to the first beam and the second beam;
e. a motor with a gear box fastened to the bar, wherein the motor engages a signal and power cord, and wherein the gear box has a keyway and a shaft housing;
f. a communication cable connecting the motor control housing with the motor;
g. a gear assembly for engaging the keyway, wherein the gear assembly comprises:
  (i) a rotatable shaft disposed through the gear box;
  (ii) a shaft key way formed in the rotatable shaft;
  (iii) a key housed in the shaft key way to engage the keyway, which allows the rotatable shaft to lock into the shaft housing;
  (iv) a latch formed in one end of the rotatable shaft, wherein the latch has a latch mechanism for engaging a coupling; and
  (vi) an alignment tool for engaging the rotatable shaft and turning the coupling to align the coupling with the electrical equipment; a
h. at least one handle disposed in one of the beams or side supports, wherein the solenoid plunger passes through the solenoid hole to depress and release an interlock button on the electrical equipment, which allows the motor to rotate the rotatable shaft with a coupling through the tool hole to engage the electrical equipment, while an operator is remotely viewing the electrical equipment through the viewing hole.

19. A method for racking electrical equipment comprising:
a. connecting a portable motorized racking tool to a remote switch operator with a current controller, wherein the portable motorized racking tool has a frame, motor, gear box with gear assembly, motor controller, and solenoid;
b. attaching a first end of a torque limiting clutch to a rotatable shaft in the gear box;
c. inserting a coupling to a second end of the torque limiting clutch;
d. setting the current controller to a predetermined amp setting;
e. aligning the coupling with the electrical equipment that needs maintenance, removal, or installation, while simultaneously attaching the frame to a metal surface adjacent the electrical equipment by using a plurality of magnets; and
f. flowing power and control signals from the remote switch operator to power and control the motor, gear assembly, and solenoid to:
  (i) remotely disconnect the electrical equipment by causing a solenoid plunger of the solenoid to engage an interlock button on the electrical equipment to allow the motor to operate the gear assembly to rotate in a first direction to a test position, then causing the solenoid plunger to engage the interlock button a second time to allow the motor to continue to operate the gear assembly rotation in the first direction to a disconnect position, while the operator maintains a position outside an arc flash hazard boundary;
  (ii) remotely connect the electrical equipment by causing the solenoid plunger to engage the interlock button, allowing the motor to operate the gear assembly to rotate in the second direction to the test position, causing the solenoid plunger to engage the interlock button, and allowing the motor to continue to operate the gear assembly rotation in the second direction to a connect position, while the operator maintains a position outside an arc flash hazard boundary;
  (iii) remotely disconnect the electrical equipment from an installed position to a test position by causing the solenoid plunger of the solenoid to engage an interlock button on the electrical equipment, allowing the motor to operate the gear assembly to rotate in the first direction to the test position, then causing the solenoid plunger to engage the interlock button a second time causing the motor to operate the gear assembly rotation in the second direction to the installed position, while the operator maintains a position outside an arc flash hazard boundary;
  (iv) remotely connect the electrical equipment from a disconnected position to the test position by causing the solenoid plunger to engage the interlock button, allowing the motor to operate the gear assembly to rotate in the second direction to the test position causing the solenoid plunger to engage the interlock button, and allowing the motor to operate the gear assembly rotation in the first direction to remove the electrical equipment, while the operator maintains a position outside an arc flash hazard boundary; or
  (v) combinations thereof.

* * * * *